(12) United States Patent
Hug

(10) Patent No.: US 6,975,397 B2
(45) Date of Patent: Dec. 13, 2005

(54) POLARIZATION STATE CONVERSION IN OPTICALLY ACTIVE SPECTROSCOPY

(75) Inventor: Werner Hug, Belmont (CH)

(73) Assignee: BioTools, Inc., Wauconda, IL (US)

(*) Notice: Subject to any disclaimer, the term of this patent is extended or adjusted under 35 U.S.C. 154(b) by 0 days.

(21) Appl. No.: 10/376,710

(22) Filed: Feb. 27, 2003

(65) Prior Publication Data

US 2004/0169923 A1 Sep. 2, 2004

(51) Int. Cl.$^7$ .................................. G01J 4/00
(52) U.S. Cl. .................. 356/364; 356/327; 250/225
(58) Field of Search .................. 356/327, 364, 356/301; 250/225; 359/386, 497, 501

(56) References Cited

U.S. PATENT DOCUMENTS

| | | | | |
|---|---|---|---|---|
| 2,976,764 A | | 3/1961 | Hyde et al. ............... 88/14 |
| 3,720,469 A | | 3/1973 | Harwit .................... 356/74 |
| 4,171,908 A | | 10/1979 | Robert et al. .............. 356/33 |
| 4,864,123 A | * | 9/1989 | Mizutani et al. ........... 250/225 |
| 5,247,176 A | * | 9/1993 | Goldstein ................. 356/368 |
| 5,371,597 A | | 12/1994 | Favin et al. .............. 356/367 |
| 5,420,717 A | | 5/1995 | Tabata .................... 359/371 |
| 5,440,117 A | * | 8/1995 | Garrett et al. ............ 250/225 |
| 5,457,536 A | | 10/1995 | Kornfield ................. 356/366 |
| 6,211,957 B1 | * | 4/2001 | Erdogan et al. ............ 356/364 |
| 6,266,141 B1 | * | 7/2001 | Morita .................... 356/365 |
| 6,618,145 B1 | * | 9/2003 | Goldstein et al. .......... 356/364 |
| 2001/0052981 A1 | * | 12/2001 | Chung et al. .............. 356/364 |

* cited by examiner

Primary Examiner—Zandra Smith
Assistant Examiner—Kara Geisel
(74) Attorney, Agent, or Firm—David G. Rosenbaum; Andrew O. Scheinman; Rosenbaum & Associates, PC

(57) ABSTRACT

The invention describes a method to eliminate instrumental offset in measurement of optically active scattering and circular dichroism. The method uses the time-average measurement of the light that is systematically transformed by a series of optical devices. The optical devises perform the function of rotating linearly polarized light, interconverting left and right circular polarized light, converting circular polarized light to rotating linear polarized light and converting linear polarized light to alternating left and right circular polarized light.

17 Claims, 6 Drawing Sheets

POLARIZATION STATE CONVERSION IN OPTICALLY ACTIVE SPECTROSCOPY

FIELD OF INVENTION

This invention deals with the field of spectroscopy and specifically with the application of spectroscopy to measurement of circularly polarized light. More specifically it deals with optical elements that can be inserted into the optical path of either the exciting light or into the optical path of the transmitted or scattered light.

All measurements of various forms of optical activity rely on a small difference in the interaction of the right and left circularly polarized (hereinafter CP) or chiral light with a chiral sample. Typically, the chiral sample consists of molecules that are chiral, i.e., molecules that have non-superimposable mirror images of each other, like a person's left and right hand. There are three areas where this interaction manifests itself in a degree that can be measured. In optically active scattering, a small difference in the intensity for the left or right CP of the scattered light from the sample when the sample is excited with left and right CP light. Alternatively, when linearly polarized light (not left and right CP light) is used to excite a chiral sample, small differences in left and right CP scattered light can be detected. Finally, in circular dichroism a small transmission difference for the right and left CP light that passes through the sample and is absorbed by the sample is measured.

The most significant problem in all three types of measurements is the occurrence of small spurious spectral intensity differences, or offsets, not due to the optically active (chiral) nature of the sample itself but rather due to the optical imperfections in the measuring instrument.

The current invention provides a means to reduce such offsets to negligible levels in the measurement of optically active light scattering and circular dichroism.

DESCRIPTION OF THE PRIOR ART

Small intensity differences in the CP measurements are typically detected by modulating the polarization of the probing light, or the polarization analyzing properties of the detection system, or both, between left and right CP, synchronized with the routing of the acquired data into a right and left detection channel. The left and right detection channel data can be electronically manipulated to give a spectral scan of the sample that incorporates only the difference in the left and right CP light detected. In principle, very small intensity differences in the CP light can be recovered and analyzed. This requires the transmission characteristics of the measuring instrument to be identical for both the right and the left CP light modulation period, except for the creation or selective detection of the right or left CP light.

Previous published approaches designed to achieve the above condition are static in the sense that they try to achieve offset free operation of the instrument at all times. They often use optics of extreme precision and rely on tight and stable control of the momentary polarization state of the light. Small persisting errors at one place in the optical train of an instrument or typically compensated for by a deliberate, judicious introduction of canceling errors elsewhere. Examples are the adjustment of the voltage of electro-optic modulators, or changing the angular orientation of static depolarizing devices. Such tedious and sometimes arbitrary procedures in order to achieve the desired flat instrumental baseline are often required for each sample measured.

SUMMARY OF THE INVENTION

The present invention uses a time averaged and automatic offset cancellation to achieve the desired flat instrumental baseline. The invention uses the selective multiple interconversion of polarization states of coherent and incoherent light to achieve a time-averaged offset-free measurement of optically active scattering or circular dichroism. The polarization conversion is applied separately in the light by individual optical elements but in a concerted manner to the incident light used to excite scattering or absorption in the sample. In the same manner, the invention is applied to the light scattered or transmitted by the sample to get a flat baseline.

An object of the invention is to achieve an offset-free circular dichroism instrument in a time averaged manner.

Another object of the invention is to achieve an offset-free optically active light scattering instrument in a time averaged manner.

Both these objectives are obtained by the invention.

BRIEF DESCRIPTIONS OF THE DRAWINGS

As part of the specification, the drawings illustrate principles of the present invention and together with the description serve to explain the invention.

DETAILED DESCRIPTION OF THE INVENTION

Figure 1:
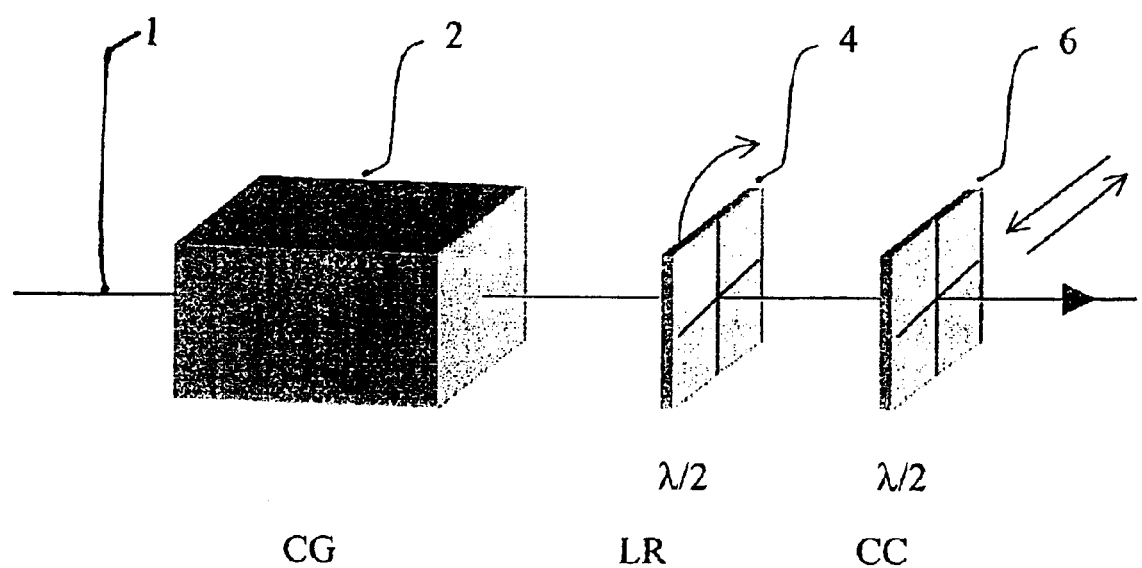
FIG. 1 is a schematic representation of a CP light generator and a pair of half-wave plates that are critical to the understanding of the invention.

The polarized light transformed by the invention by itself does not have, and does not need to have, ideal polarization properties with respect to the intended measurement. The time-averaged cancellation of measurements performed with transformed light and untransformed light over a finite interval of time eliminates offsets. During the process, polarization and intensity information on optically active scattering is preserved.

One of the properties imparted to a beam of light by the invention is a time-averaged isotropic superposition of the linear polarization states of the beam of light. If a polarization analyzer was placed into a beam of light after the beam had passed through the invention, the time-averaged amount of light for any azimuthal orientation about the direction the beam of light propagates in would be equal.

Another property imparted on a beam of light that has been modulated between right and left CP light is the precise equilibration on the amount of right CP light in the right modulation period with the amount of left CP light in the left modulation period. The invention also achieves the precise equilibration of the total light intensities in the two modulation periods.

Another property imparted to the beam of light, where no modulation between right and left CP states is performed, is the extremely precise time-averaged equilibration of the amounts of right and left CP light that the beam contains. This property is effectively imparted to the light beam by the invention and is useful for the incident light beam hitting the sample.

Another property conferred to the scattered or transmitted beam of light where the beam is circular polarization analyzed is the conversion of the beam's circular component from right to left circular and from left to right circular. The invention presents the right CP transmitted or scattered light first as right CP light and next as left CP light to the circular polarization analyzer. The reciprocal sequence presents the left CP scattered or transmitted light to the analyzer first as left and then as right CP light.

Devices that can effect the required transformations of the polarization states of the light are optical retardation plates based on birefringence or on Fresnel reflection. The present invention uses half-wave and quarter wave retardation plates that are well known in the prior art. A half-wave retardation plate has two effects on the beam of light that are important to the invention. First, the half-wave plate will convert right CP light into left CP light and left CP light into right CP light. Second, the half-wave plate converts one linearly polarization state into another with the resulting plane of polarization rotated by twice the angle between the plane of polarization of the incident light and the fast axis of retardation. Thus, if the incident light has a plane of polarization of zero degrees and the fast axis of retardation of the half-wave plate is at ten degrees, the beam of light exiting from the half-wave plate will have a plane of polarization of twenty degrees.

A quarter-wave retardation plate also has two effects on the light that are important to the invention. First, the quarter wave plate converts CP light into linearly polarized light with a plane of polarization oriented at +45 degrees or −45 degrees to the fast axis of the retardation. Second, the quarter-wave plate can convert linearly polarized light that is oriented at +45 degrees or −45 degrees to the retardation axis of the quarter-wave plate to right or left CP light. All this is well known to those experienced in the art of making spectrometers for various functions.

The half-wave or the quarter-wave retardation plate based on birefringence performs the above functions precisely only at a specific wavelength of incident light. At neighboring wavelengths close to the exact half-wave or quarter-wave wavelength of ideal operation, a retardation plate acts to nearly the same extent as that of an exact half-wave or quarter-wave retardation plate at that particular wavelength. The effectiveness of the invention described herein is such that a range of wavelengths covering approximately plus or minus ten percent of the exact wavelength of ideal operation is sufficient to time-average offsets to below negligible levels if appropriate retardation plates are used. Approximately twice this range of wavelengths can be covered by repeated application of the invention with two half-wave or quarter-wave plates that have an overlapping central wavelength differing by approximately 20 percent. Outside this approximate range, achromatic retardation plates are required to effect polarization cancellation of offsets across a broader region of the spectrum.

FIG. 1 shows a schematic diagram of the invention. Initially the beam of light 1 generated by a light source like a laser passes through the basic switchable circular polarization generator 2. The circular polarization generator 2 can be any of the known type of devices used to alternately generate left and right CP light. The light generated from such a device is sometimes called elliptically polarized light because it consists of a large circular component and a small linear component of different size and orientation for the two modulation periods. So the light coming from the polarization state generator 2 can be considered as largely left and right CP light with a small linearly polarized component.

Next the light passes through a rotating half-wave plate 4. This rotating half-wave plate is called the linear rotator, and its purpose is to systematically rotate the orientation of the plane of polarization of the linear component of the light evenly in time over all possible orientations. Thus to use our example from above, if the initial plane of the polarized light coming from the polarization state generator 2 is zero degrees and the retardation axis of the half-wave plate 4 at this instant in time is ten degrees, then the plane of polarization of the light coming out of the linear rotator is twenty degrees. In the next instant of time, the plane of polarization of the linear component coming from the polarization state generator 2 is still zero degrees, and the linear rotator 4 has rotated the retardation axis to eleven degrees, the plane of polarization of the light exiting the linear rotator is twenty-two degrees. In time, the linear rotator will rotate the linear component evenly over all orientations.

An undesired effect of the linear rotator 4 is to convert the left CP light into right CP light and the right CP light into left CP light. This problem can be corrected for by simply interchanging the registration of the right and left modulation periods in the data collection channels of the data collector.

After the light leaves the linear rotator, it strikes another half-wave plate called the circularity converter 6 that can move in and out of the optical path. The circularity converter changes left CP light into right CP and vice versa. If, as is common, a difference exists in the intensity of the circular polarized light between the left and the right modulation period with the circularity converter out of the optical path, it will also exist with the circularity converter in the optical path. If the circularity converter is in the optical path, the left and right CP light will be interchanged. If, over a period of time, the circularity converter is repeatedly moved into and out of the optical path, the relative intensity differences of the left and right CP components of the light will be equal when they are time averaged.

A preferred arrangement of the invention according to FIG. 1 uses a rotating circularity converter 6 with the direction of rotation, speed of rotation and phase chosen to be optimized with the light produced by the linear rotator 4. A strongly preferred embodiment of the rotating circularity converter consists of synchronized quarter wave plates rotating in the same direction first with their fast axes aligned and then with the fast axis of one plate aligned with the slow axis of the second plate. With the fast axes aligned, the circularity converter would be a half-wave plate and with the fast axis of one plate aligned with the slow axis of the second plate, it would be a zero-wave plate thus imparting no change to the left and right CP light. There are also non-moving embodiments of circularity converters that use stress or electrically induced variable retardation.

Figure 2:
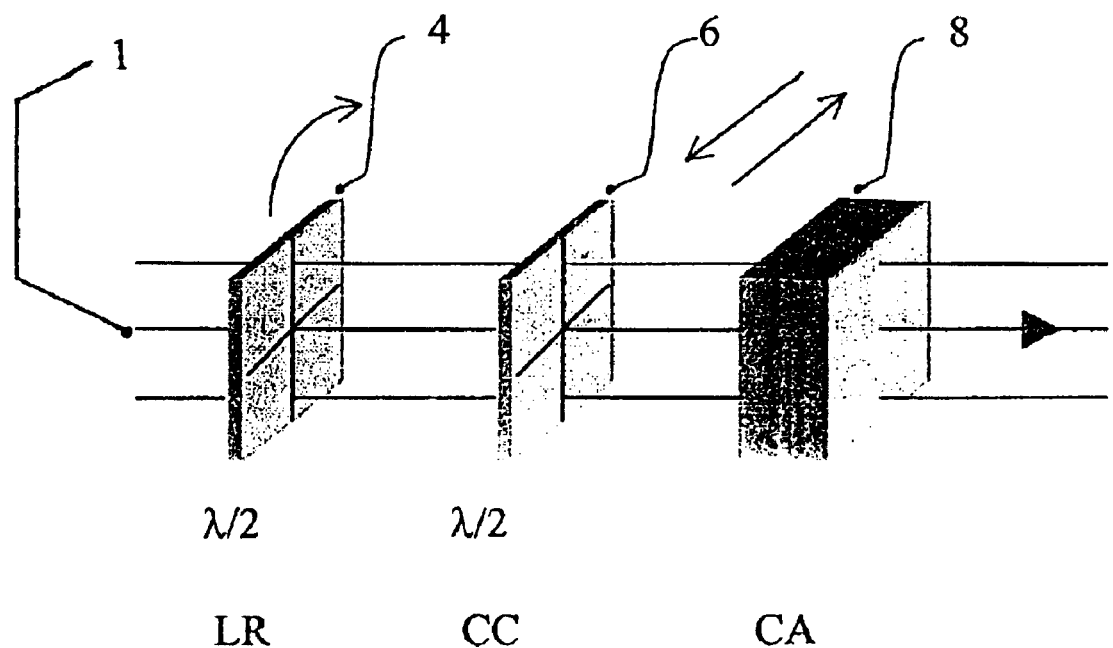
FIG. 2 is a schematic representation showing the wave plates critical to the invention with a circular polarization analyzer.

FIG. 2 is a schematic diagram of the invention as it is configured for analysis of left and right CP light. After the light 1 leaves the sample, it interacts first with the rotating half-wave plate, the linear rotator 4. The effect of the linear rotator on the light is the same as described above. The linear polarized component of the light that passes through the linear rotator 4 is rotated evenly in time so that there is no time-averaged orientation to the linearly polarized component of the light. Thus there is a time-averaged absence of sensitivity to the size and direction of the linear polarization components of the light. Again the left and right CP light are converted to right and left CP light respectively, but this is inconsequential and can be corrected for by interchanging the registration of the left and right modulation periods in the detector.

Just as in the previous description, the action of the circularity converter 6 that moves into and out of the light path is to inter-convert the left and right CP light that passes through it. The inter-conversion allows for the precisely equal transmission characteristics for the right and left CP components of the light.

The basic circularity polarization analyzer 8 can be any of the well known kind of devices used to alternately, or simultaneously, determine the size of the right and left CP component of the light incident on them. Practical devices inevitably show a slight sensitivity in their transmission characteristics to the direction of the axes of the polarized light being analyzed. Mechanically, electrically, or other switchable devices, which alternately direct the left and right CP incident light into the same detection channel, can also show different transmission characteristics for the two switching positions. In the present invention, the action of the circularity converter 6 means that any offset that may be in the analyzer for the difference between right and left CP light will cancel. Thus by moving the circularity converter into and out of the light path, offsets that would only affect the left CP light will now affect the right CP light in exactly the same manner.

The preferred embodiment of the invention in FIG. 2 uses a rotating circularity converter 6 with its direction of rotation, speed of rotation, and phase of rotation chosen to be optimized with the effect produced by the linear rotator 4. Practical devices are the same as described for FIG. 1 above.

Figure 3:
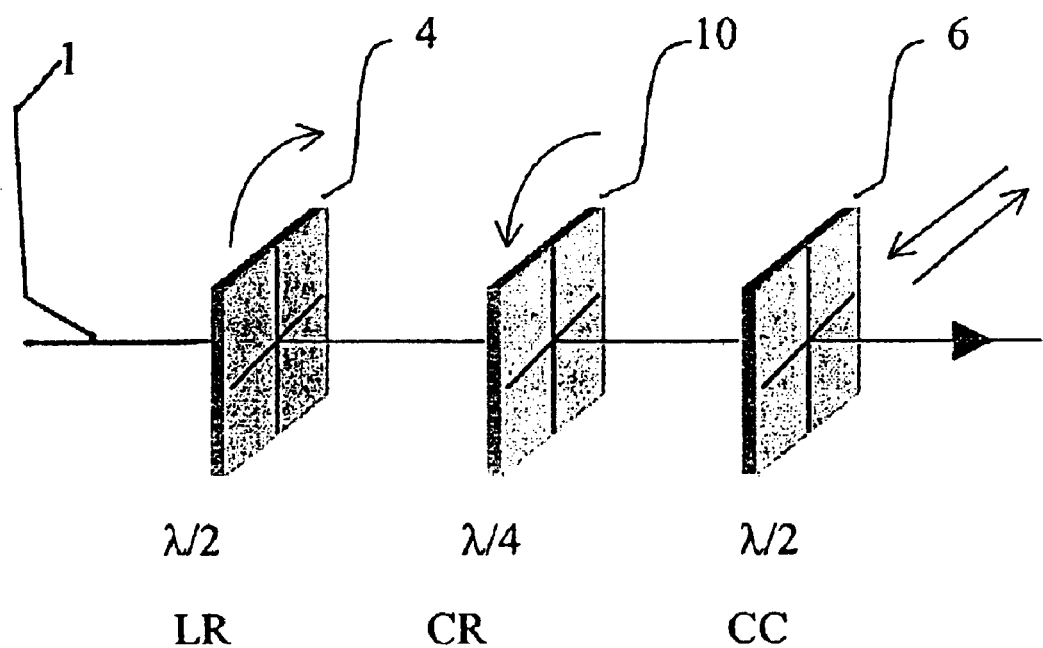
FIG. 3 is a schematic representation showing the wave plates that are critical to the invention with the addition of an additional wave plate that enhances the invention.

FIG. 3 is a schematic diagram of the invention which an additional element has been added. The additional element is a rotating quarter-wave plate 10, the circular rotator, which is placed into the optical path between the linear rotator 4 and the circularity converter 6. The effect of the circular rotator on the incident light is to convert a net right or left CP light into a rotating linearly polarized component with the same direction and velocity of rotation as the circular rotator 10. The effect on a linear component of the light is to convert it alternately into right and left CP light, with an intermediate passing through elliptical and linear polarization states.

It is an important aspect of the arrangement of FIG. 3, in order to achieve the level of precision required in optically active scattering or transmission, with moderate speeds of rotation, that the velocity and phase of the rotation of the linear rotator 4 and of the circular rotator 10 must be locked to the instrumental data acquisition cycle. The rotations must also be synchronized to each other. In particular, the absolute and relative speed of rotation of the linear rotator 4 and the circular rotator 10 must take into account a time-varying character of the amount and polarization of the light incident on the arrangement. For very high rotation speeds, the synchronization requirements can be relaxed. Sufficient averaging can be achieved under this condition by proper de-synchronization of the two rotation speeds.

A preferred embodiment uses counter-rotating plates 4 and 10, In the case of static elliptical polarized incident light, the preferred speed of rotation of the circular rotator 10 is twice the speed of rotation of the linear rotator 4.

The function of the circularity converter 6, that is moved into and out of the light path, is to further equilibrate the right and left CP light produced by the action of the linear rotator and the circular rotator. The effect of the circularity converter on the various lights has been described above.

The effect of the optical elements as shown in FIG. 3 and the above explanation on an arbitrarily polarized light beam is to remove, in a time averaged manner to a very high degree of precision, all traces of linear and circular bias on the light beam. At any instance the components of the light beam may have offsets, but if the measurements are conducted over a period of many rotations of the components of the invention, all the offsets go to zero. Any optical device that can completely scramble the polarization states of the light beam can achieve a similar result. Such a device is the fiber-squeezer-based dynamic polarization scrambler. By contrast, the effect of the optical elements depicted in FIG. 1 and FIG. 2 on arbitrarily polarized left and right CP light beams is first to time average to zero all linear polarization components. Second, as depicted in FIG. 1, it is to remove any imbalance in the amount of left and right CP light incident on the sample generated by the circular polarization generator 2. Third, as depicted in FIG. 3, it is to remove any imbalance in the response of the circular analyzer, or subsequent optics, to left versus right CP light. Thus, the optical elements depicted in FIGS. 1 and 2 represent the essence of the invention which does not scramble the polarization states of the light, but rather they transform the polarization states of light in a controlled time-average manner. This controlled manner then yields the precise measurement of the differential effect a chiral sample has on the scattering or absorption of pure left and right CP light without interfering intensity offsets from the instrumental optical components.

The precision of the retardation of the half-wave plate in the linear rotator 4 and the circular converter does not need to be extraordinarily high. Time-average rotation to zero of small linear components is important but not required to be absolutely perfect. Balancing the circularity and total intensity of the exciting light, on the other hand, does need to be nearly perfect. If the correction achieved with a single circularity converter 6 is insufficient, a second circularity converter could be installed in the optical path and operate just like the first one. If necessary, this operation could be repeated a third time and fourth time etc. Arbitrarily precise balancing of the relative circular content of the light can be achieved this way.

EXAMPLE

Optical Offset Elimination in Collinear Scattered Circular Polarization Raman Optical Activity Scattering (SCP-ROA)

Figure 4:
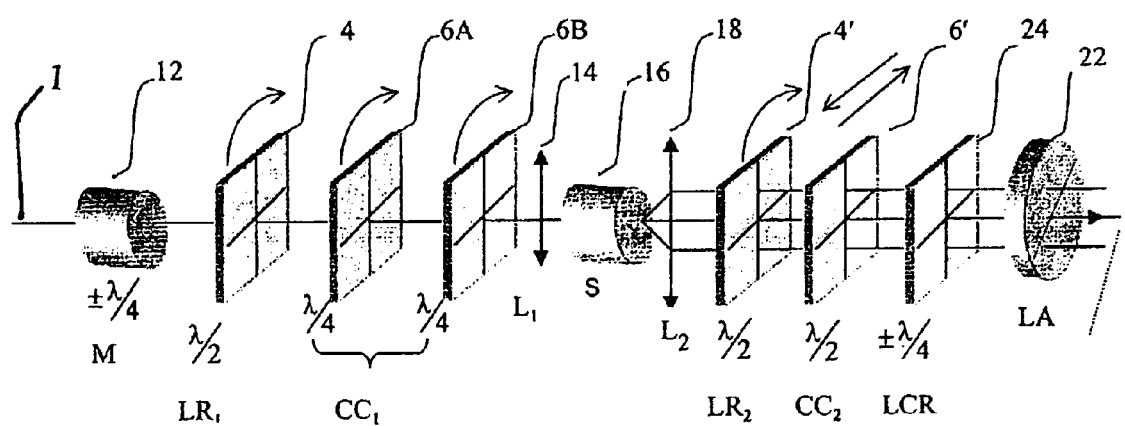
FIG. 4 is a schematic of the invention incorporated into the optical path of a scattered circular polarization Raman optically activity scattering instrument.

Scattered circular polarization Raman optical activity scattering (SCP-ROA) is defined as the difference in the Raman scattered light intensity from a sample of chiral molecules for alternately or simultaneously analyzed right and left CP scattered Raman light. The incident light is in a fixed unpolarized state. FIG. 4 is a schematic of how the invention would be used in SCP-ROA. Forward scattering is used in this example, but identical considerations apply to other scattering geometry.

FIG. 4 is a schematic of the device that achieves the balancing of the content of the left and right CP light to a high level of precision that is required for this technique. The arrangement in FIG. 4 achieves this level of precision, in a time-averaged fashion, without any need for the precise adjustment even for incident light having a circularity content of one percent or more. If high quality linear polarized light is available from the polarization modulator 12, then it is possible to omit the circular rotator 10 of FIG. 3 from the light that is exciting the sample. As shown above the invention leads to the complete equilibration, in a time averaged fashion, of all the linear and circular components of the light prior to the focusing lens 14 and the sample 16. So essentially the light has no polarization characteristics in a time averaged fashion.

The polarization analyzing section for the scattered light uses the linear rotator 4' and the circularity converter 6' to correct offsets created by the basic circular polarization analyzer. The polarization analyzer is assumed to consist of an electrically switchable liquid crystal retarder 24 and a linear polarization analyzer 22. The light transmission of liquid crystal retarders depends of their switching position. Differences can reach 2 parts in 1000. Such devices, in spite of their otherwise desirable characteristics, have, therefore, not been applicable to the precise measurement of the optical activity phenomena. The use of the circularity converter makes it possible for the first time to use the liquid crystal retarder.

Figure 5:
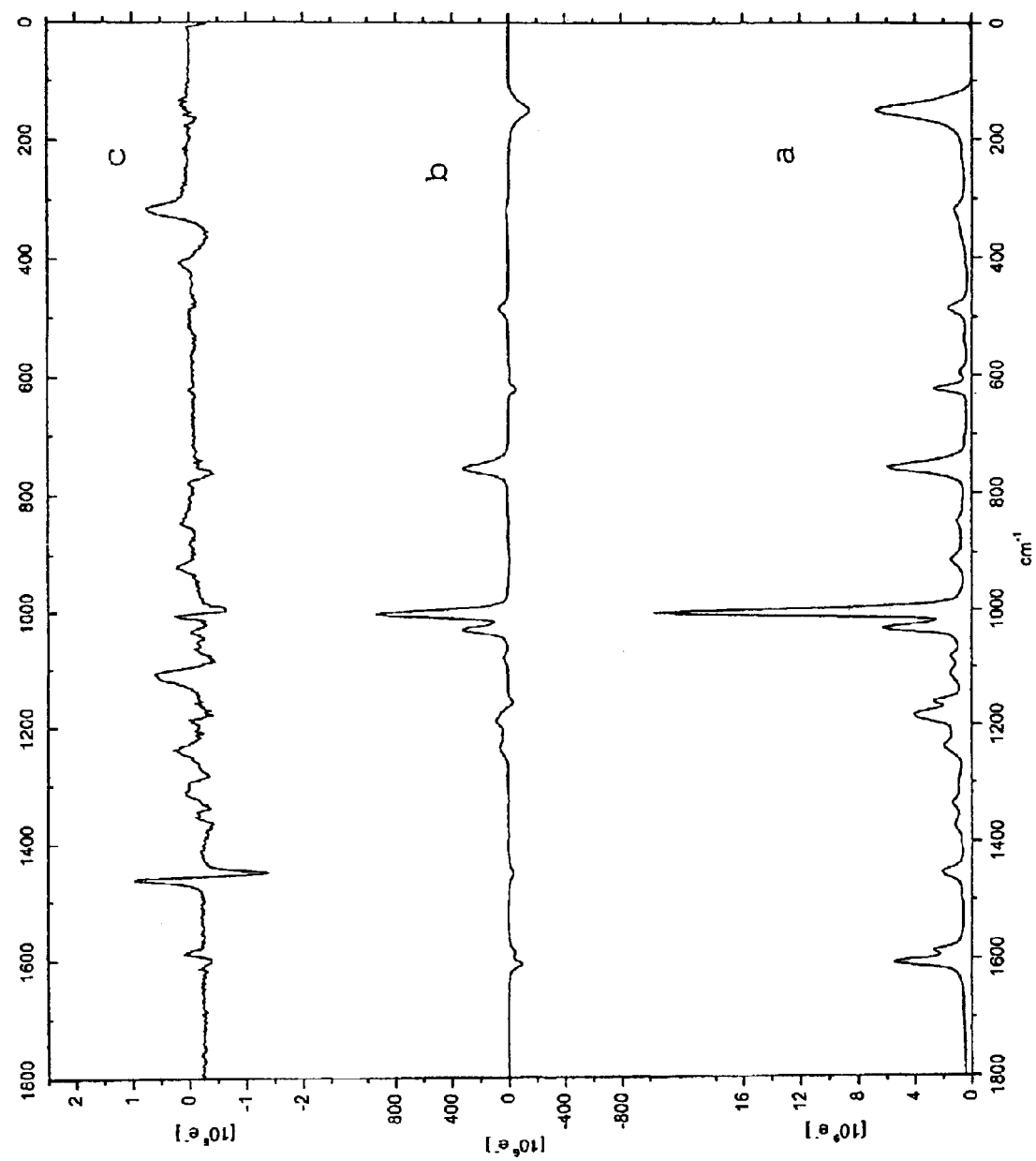
FIG. 5 shows the spectra of a compound using the invention in an instrument as described in FIG. 4.

FIG. 5 is an example of the effectiveness of the invention for the particular case of SCP-ROA scattering of the optically active compound (-)-alpha-phenylethylamine. The measurement conditions are 420 seconds total illumination time and approximately 270 milliwatts of laser power directed at the sample. The bottom spectral trace labeled a is the unpolarized parent Raman spectrum of the compound. The middle spectral trace labeled b shows circular difference spectrum recorded with the mostly linearly polarized laser light without application of any correction scheme. The observed signal for the dominant polarized band situated at approximately 1000 $cm^{-1}$ is almost entirely due to the instrumental offset and is of the order of four percent of the parent Raman signal. The top spectral trace labeled c shows the actual SCP-ROA spectrum obtained by introducing into the light path of the exciting light the optical elements shown in FIG. 3 and a circularity converter into the path of the scattered light. (The linear polarization rotator was not used in the optical path of the scattered light because the absence of measurable offsets in the light collection optics and the scattering cell.) It is seen that the actual SCP-ROA signal which is the signal of interest of the 1000 $cm^{-1}$ signal, is at most of the order of $\pm 2 \times 10^{-5}$ of the size of the parent Raman signal and the instrument offset is reduced by more than a factor of 2000 by the use of the present invention.

Figure 6:
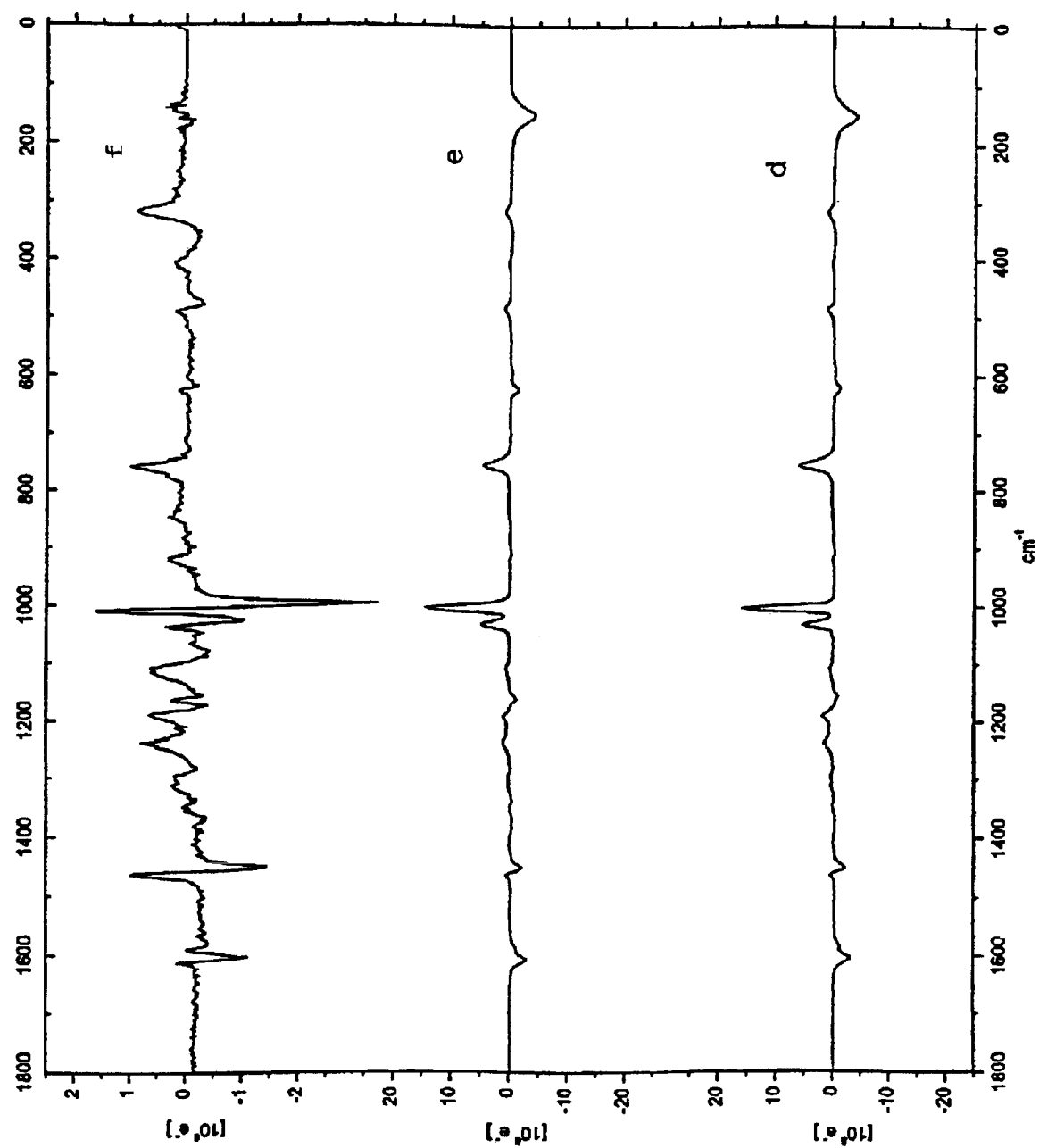
FIG. 6 shows additional spectra of a compound using the invention in an instrument as described in FIG. 4.

FIG. 6 demonstrates the importance of the use of the circularity converter described in the invention. The bottom trace d was recorded with the linear rotator and the circular rotator in the exciting light path. No other correction elements were in the excitation light path. Instrumental offset for the 1000 $cm^{-1}$ signal is larger than six parts in ten thousand, which is over thirty times the actual ROA signal. This is typical of the best result one might expect from the use of a stress induced birefringent fiber optics polarization scrambler in the exciting light. No improvement would result from the additional use of a linear rotator in the scattered light.

The middle trace labeled e in FIG. 6 shows the effect of the introduction of a circularity converter into the scattered light only. Incremental reduction in the instrumental offset is visible but minor.

The top trace labeled f in FIG. 6 demonstrates the effect of the introduction of the circularity converter into the exciting light only. So in the top trace all three elements of the invention as shown in FIG. 3 are in the exciting light path. The instrumental offset reduction for the 1000 $cm^{-1}$ signal is about five times as effective as compared to the bottom trace of FIG. 6. The comparison with the actual ROA spectrum (c of FIG. 5) shows that the circularity converters in both the exciting and the scattered light are required for the reliable SCP measurement of ROA effects other than those with large ratios of ROA intensity to the intensity of the parent Raman band.

Experimenters skilled in the optical arts can determine other benefits of the invention by placing a single element or multiple elements of the invention in to the light path and determining the resulting spectrum. Those skilled in the optical arts may see further applications of the invention, such as incident circular polarization Raman optical activity, dual circular polarization Raman optical activity, electronic and vibrational circular dichroism instruments. The time-average signal that is available and is free from offsets can be used in either scattering or circular dichroism applications to obtain highly precise spectra. This description of the invention is designed to describe embodiments that might be useful to those skilled in the optical arts. Placing the invention in the exciting light path, the transmitted light path, or the scattered light path will have various beneficial effects for experimenters skilled in the optical arts. In addition, it is possible to combine the present invention in the dual polarization modulation spectrometer as described in U.S. Pat. No. 6,480,277 (Nafie, 2002)

We claim:

1. A time-averaged offset cancellation device for spectrometric analysis comprising:
   a. at least one linear rotator, wherein said linear rotator provides a time-averaged reduction in any linear polarization offset of the light beam passing through said linear rotator; and,
   b. at least one circularity converter inserted into said light beam after said linear rotator, wherein said circularity converter provides a time averaged reduction in any intensity offset between the left and right circularly polarized components of the light beam passing through said circularity converter.

2. The time-averaged offset cancellation device of claim 1, wherein said linear rotator time averages the linear polarization offset of the light beam passing through said linear rotator over all orientations.

3. The time-averaged offset cancellation device of claim 1, wherein said linear rotator comprises a rotating half-wave plate.

4. The time-averaged offset cancellation device of claim 1, wherein said circularity converter repetitively alternates between changing left circularly polarized light into right circularly polarized light and changing right circularly polarized light into left circularly polarized light.

5. The time-averaged offset cancellation device of claim 1, wherein said circularity converter comprises a half-wave plate that repetitively moves into and out of said light beam.

6. The time-averaged offset cancellation device of claim 1, wherein said circularity converter comprises a rotating circularity converter.

7. The time-averaged offset cancellation device of claim 6, wherein said rotating circularity converter comprises a first rotating quarter-wave plate with a fast axis and a slow axis and a second rotating quarter-wave plate with a fast axis and a slow axis rotating in the same direction as the first quarter-wave plate but at a different speed than the first quarter-wave plate in which first the fast axes of the plates are aligned and then the fast axis of the first plate is aligned with the slow axis of the second plate whereby left and right circular polarized light are interconverted when the fast axes are aligned and not interconverted when the fast axis of first quarter-wave plate is aligned with the slow axis of the second quarter-wave plate.

8. The time-averaged offset cancellation device of claim 1, wherein said circularity converter is a non-moving circularity converter.

9. The time-averaged offset cancellation device of claim 8, wherein said non-moving circularity converter is selected from the group consisting of a stress-induced variable retardation circularity converter and an electrically-induced variable retardation circularity converter.

10. The time-averaged offset cancellation device of claim 1, wherein said time-averaged offset cancellation device comprises more than one circularity converter.

11. The time-averaged offset cancellation device of claim 1, wherein said time-averaged offset cancellation device further comprises a time-averaging signal measurement device inserted into said light beam after said circularity converter.

12. The time-averaged offset cancellation device of claim 1, wherein said time-averaged offset cancellation device further comprises a circular rotator inserted into said light beam between said linear rotator and said circularity converter, wherein said circular rotator converts circularly polarized light to rotating linearly polarized light and linearly polarized light to alternately left and right circularly polarized light.

13. The time-averaged offset cancellation device of claim 12, wherein said circular rotator comprises a rotating quarter-wave plate.

14. The time-averaged offset cancellation device of claim 12, wherein said circular rotator comprises counter-rotating plates.

15. A time-averaged offset cancellation device for spectrometric analysis comprising:

a. at least one linear rotator, wherein said linear rotator provides a time-averaged reduction in any linear polarization offset of the light beam passing through said linear rotator; and, b. at least one circular rotator inserted into said light beam after said linear rotator, wherein said circular rotator converts circularly polarized light to rotating linearly polarized light and linearly polarized light to alternately left and right circularly polarized light.

16. A method for reducing offsets in a spectrometer, said method comprising the use in said spectrometer of a time-averaged offset cancellation device comprising:

a. at least one linear rotator, wherein said linear rotator provides a time-averaged reduction in any linear polarization offset of the light beam passing through said linear rotator; and, b. at least one circularity converter inserted into said light beam after said linear rotator, wherein said circularity converter provides a time averaged reduction in any intensity offset between the left and right circularly polarized components of the light beam passing through said circularity converter.

17. A method for reducing offsets in a spectrometer, said method comprising the use in said spectrometer of a time-averaged offset cancellation device comprising:

a. at least one linear rotator, wherein said linear rotator provides a time-averaged reduction in any linear polarization offset of the light beam passing through said linear rotator; and, b. at last one circular rotator inserted into said light beam after said linear rotator, wherein said circular rotator converts circularly polarized light to rotating linearly polarized light and linearly polarized light to alternately left and right circularly polarized light.

* * * * *